(12) United States Patent
Chandramouli

(10) Patent No.: US 11,528,648 B2
(45) Date of Patent: Dec. 13, 2022

(54) HYBRID RELEASE FOR PROCESSING USER EQUIPMENT TRANSACTION

(71) Applicant: NOKIA TECHNOLOGIES OY, Espoo (FI)

(72) Inventor: Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/349,355

(22) PCT Filed: Nov. 15, 2017

(86) PCT No.: PCT/US2017/061767
§ 371 (c)(1),
(2) Date: May 13, 2019

(87) PCT Pub. No.: WO2018/093875
PCT Pub. Date: May 24, 2018

(65) Prior Publication Data
US 2019/0364475 A1    Nov. 28, 2019

Related U.S. Application Data

(60) Provisional application No. 62/422,558, filed on Nov. 15, 2016.

(51) Int. Cl.
| | | |
|---|---|---|
| *H04L 12/00* | (2006.01) |
| *H04W 36/12* | (2009.01) |
| *H04W 76/30* | (2018.01) |
| *H04W 36/00* | (2009.01) |
| *H04W 48/16* | (2009.01) |
| *H04W 80/10* | (2009.01) |

(52) U.S. Cl.
CPC ....... *H04W 36/12* (2013.01); *H04W 36/0033* (2013.01); *H04W 48/16* (2013.01); *H04W 76/30* (2018.02); *H04W 80/10* (2013.01)

(58) Field of Classification Search
None
See application file for complete search history.

(56) References Cited

U.S. PATENT DOCUMENTS

| | | |
|---|---|---|
| 2009/0304385 A1 | 12/2009 | Khermosh |
| 2010/0142517 A1 | 6/2010 | Montemurro et al. |

(Continued)

OTHER PUBLICATIONS

3GPP draft S2-166624_Solution for of avoidance of UE interaction from NFLoad Balancing (Year: 2016).*

(Continued)

*Primary Examiner* — Ajit Patel
*Assistant Examiner* — Lionel Preval
(74) *Attorney, Agent, or Firm* — Squire Patton Boggs (US) LLP

(57) ABSTRACT

Various communication systems may benefit from handling of various connection states. For example, certain wireless communication systems may benefit from a hybrid release that may enable any access management function to process a user equipment transaction. A method can include determining, by an access management function, whether to remain a serving node for a user equipment. The method can include taking an action with respect to an NG2 association for the user equipment based on the determination.

16 Claims, 6 Drawing Sheets

(56) References Cited

U.S. PATENT DOCUMENTS

| | | | |
|---|---|---|---|
| 2010/0146610 A1 | 6/2010 | Kim et al. | |
| 2014/0136673 A1 | 5/2014 | Anpat et al. | |
| 2015/0139048 A1 | 5/2015 | Lou | |
| 2016/0037422 A1 | 2/2016 | Rost et al. | |
| 2019/0158360 A1* | 5/2019 | Xu | H04W 8/02 |
| 2019/0166647 A1* | 5/2019 | Velev | H04W 76/11 |
| 2019/0320476 A1* | 10/2019 | Wang | H04W 76/15 |
| 2019/0335527 A1* | 10/2019 | Byun | H04W 8/08 |
| 2019/0357106 A1* | 11/2019 | Ke | H04W 36/12 |
| 2019/0364541 A1* | 11/2019 | Ryu | H04W 76/25 |
| 2020/0187277 A1* | 6/2020 | Lee | H04W 80/10 |

OTHER PUBLICATIONS

International Search Report and Written Opinion dated Feb. 13, 2018 corresponding to International Patent Application No. PCT/US2017/061767.

Mitra et al., "5G mobile technology: A survey" ICT Express 1 (2015), pp. 132-237, Jan. 22, 2016.

Kim et al., "3GPP SA2 architecture and functions for 5G mobile communication system," ICT Express 3 (2017) pp. 1-8, Apr. 13, 2017.

Apr. 6, 2020 Extended Search Report issued in European Patent Application No. 17872832.5.

INTEL: "Solution for avoidance of UE interaction from NF Load Balancing, Scaling and Migration", 3GPP Draft; S2-166624_NEXTGEN_KI19, 3RD Generation Partnership Project (3GPP), Mobile Competence Centre; 650, Route Des Lucioles; F-06921 Sophia-Antipolis Cedex; France, vol. SA WG2, No. Reno, Nevada, USA; Nov. 14, 2016.

Nokia et al.: "Solution for "Key issue on Network Function Granularity and Interconnection between them"", 3GPP Draft; S2-164603_CONTROLPLANEINTERCONNECTION-V4, 3RD Generation Partnership Project (3GPP), Mobile Competence Centre; 650, Route Des Lucioles; F-06921 Sophia-Antipolis Cedex; France, vol. SA WG2, No. Sanya, China; Aug. 23, 2016.

INTEL: "Way forward on Service-based architecture, Messaging bus and Data layer", 3GPP Draft; S2-166627_NEXTGEN_ARCH_WF, 3rd Generation Partnership Project (3GPP), Mobile Competence Centre; 650, Route Des Lucioles; F-06921 Sophia-Antipolis Cedex; France, vol. SA WG2, No. Reno, Nevada, USA; Nov. 14, 2016.

Devaki C: "Data Layer Framework Why? What? How?", 3GPP Draft; S2-166590-DL-USECASES-PROPOSAL-IN-A-NUTSHELL-V1, 3RD Generation Partnership Project (3GPP), Mobile Competence Centre; 650, Route Des Lucioles; F-06921 Sophia-Antipolis Cedex; France, Nov. 14, 2016.

Communication pursuant to Article 94(3) EPC issued in corresponding European Patent Application No. 17 872 832.5 dated Aug. 18, 2021.

First Office Action issued in corresponding Chinese Patent Application No. 201780070477.9 dated Jul. 13, 2022.

* cited by examiner

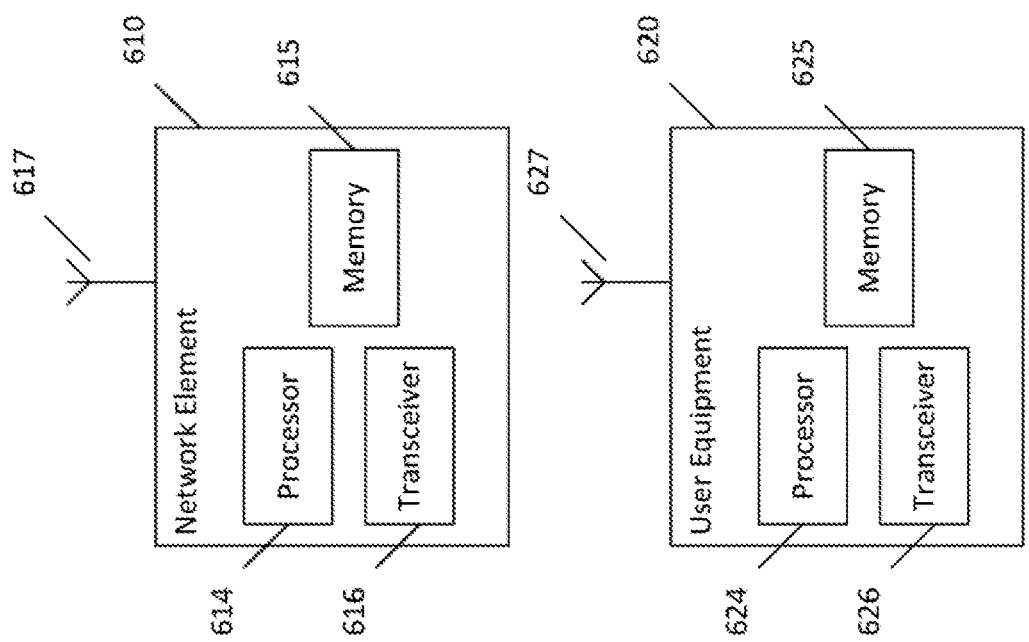

HYBRID RELEASE FOR PROCESSING USER EQUIPMENT TRANSACTION

CROSS-REFERENCE TO RELATED APPLICATION

This application is related to and claims the benefit and priority of U.S. Provisional Patent Application No. 62/422,558, filed Nov. 15, 2016, the entirety of which is hereby incorporated herein by reference.

BACKGROUND

Field

Various communication systems may benefit from handling of various connection states. For example, certain wireless communication systems may benefit from a hybrid release that may enable any access management function to process a user equipment transaction.

Description of the Related Art

Fifth generation (5G) communication systems may be applied to a variety of use cases. Those use cases can include massive broadband that delivers gigabytes of bandwidth in uplink and downlink per second on demand; critical machine-type communication that allows for the immediate, with extreme low end to end (e2e) latency, synchronous eye-hand feedback that permits remote control of robots and cars; and massive machine-type communication that connects billions of sensors and machines.

One difference between fourth generation (4G) and 5G design requirements is the diversity of use-cases that 5G networks must support as compared to 4G networks, which were primarily designed for the single use-case of delivering high speed mobile broadband.

5G will not only be a new radio access technology (RAT) family but 5G architecture will expand to multiple dimensions by providing a common core for multiple radio technologies, including cellular, Wi-Fi, and fixed, as well as for multiple service such as Internet of Things (IoT), mobile broadband, and low latency-high reliability, and further for multiple network and service operators.

In 5G, the Next Gen System may be virtualized and consequently radio access network (RAN) functions, such as cloud RAN, and core network functions may be running on top of a data center. The compute functions may need to be decoupled from the storage layer, leveraging virtualization infrastructure. Supporting network functions that are completely stateless creates a new dimension of challenges. For example, a data exposure solution leveraging a data layer is proposed for standardization to TR 23.799, solution 6.7.5.

SUMMARY

According to a first embodiment, a method can include determining, by an access management function, whether to remain a serving node for a user equipment. The method can include taking an action with respect to an NG2 association for the user equipment based on the determination.

In a variant, when the determination is that the access management function is to remain the serving node, the method can further include storing the NG2 association.

In a variant, when the determination is that the access management is not to remain the serving node, the method can further include storing the user equipment context in a shared data layer.

In a variant, when the determination is that the access management is not to remain the serving node, the method can further include maintaining an NG3 connection for the user equipment.

In a variant, when the determination is that the access management is not to remain the serving node, the method can further include releasing an NG2 connection for the user equipment.

In a variant, the releasing the NG2 can include sending an NG2 light release to a radio access network element.

In a variant, the releasing can further include sending an NG11 release to the SMF. This gives the hint to SMF that NG4 is released while UP connectivity is still ON.

In a variant, the determination can be based on a user equipment type.

In a variant, the type can be at least one of a smart phone or an internet of things device.

In a variant, the determination can be based on whether the user equipment is expected to remain in a long connected state or whether the user equipment is expected to remain in a state that involves no or infrequent control plane messaging.

According to a second embodiment, an apparatus can include means for performing the method according to the first embodiment, in any of its variants.

According to a third embodiment, an apparatus can include at least one processor and at least one memory including computer program code. The at least one memory and the computer program code can be configured to, with the at least one processor, cause the apparatus at least to perform the method according to the first embodiment, in any of its variants.

According to a fourth embodiment, a computer program product may encode instructions for performing a process including the method according to the first embodiment, in any of its variants.

According to a fifth embodiment, a non-transitory computer readable medium may encode instructions that, when executed in hardware, perform a process including the method according to the first embodiment, in any of its variants.

BRIEF DESCRIPTION OF THE DRAWINGS

For proper understanding of the invention, reference should be made to the accompanying drawings, wherein:

FIG. 6 illustrates a system according to certain embodiments.

DETAILED DESCRIPTION

Certain embodiments provide a hybrid model to avoid NG2 stickiness for mobile originated (MO) transactions. Moreover, certain embodiments avoid NG11 stickiness for MT transactions. For example, certain embodiments provide a solution for any access management function (AMF) to become the serving AMF for subsequent user equipment (UE) transactions in the middle of non-access stratum (NAS) connected mode.

Figure 1:
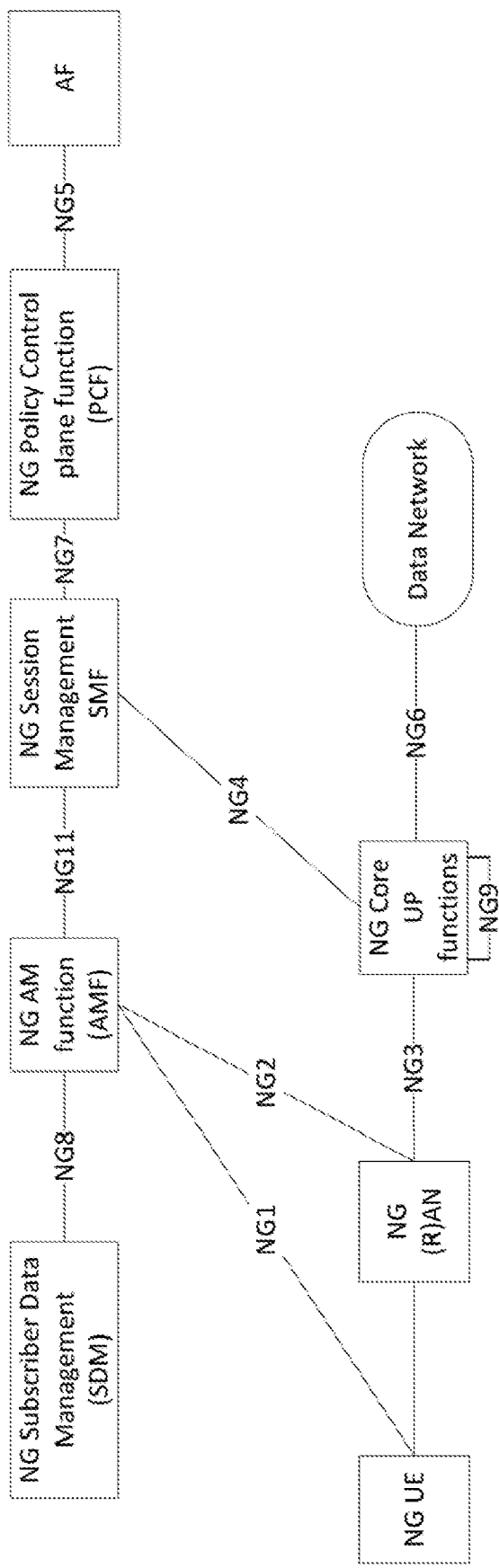
FIG. 1 illustrates an architecture according to certain embodiments.

FIG. 1 illustrates an architecture according to certain embodiments. As shown in FIG. 1, a next generation (NG) user equipment may be connected to an NG radio access network (RAN) over an unlabeled interface. The NG UE may be connected to an NG AMF over interface NG1, while the NG RAN may be connected to the NG AMF over interface NG2. The NG RAN may be connected to NG core user plane (UP) functions over NG3.

The NG core UP functions can be connected to an NG session management function (SMF) over NG4. The NG core UP functions may also be connected to a data network over NG6. Furthermore, the NG core UP functions may be connected to other NG core UP Functions over NG9.

NG SMF can be connected to NG AMF over NG11. Moreover, NG SMF can be connected over NG7 to NG policy control plane function (PCF). The NG PCF can be connected to an application function (AF) over NG5. The NG AMF can be connected to NG subscriber data management (SDM) over NG8.

Figure 2:
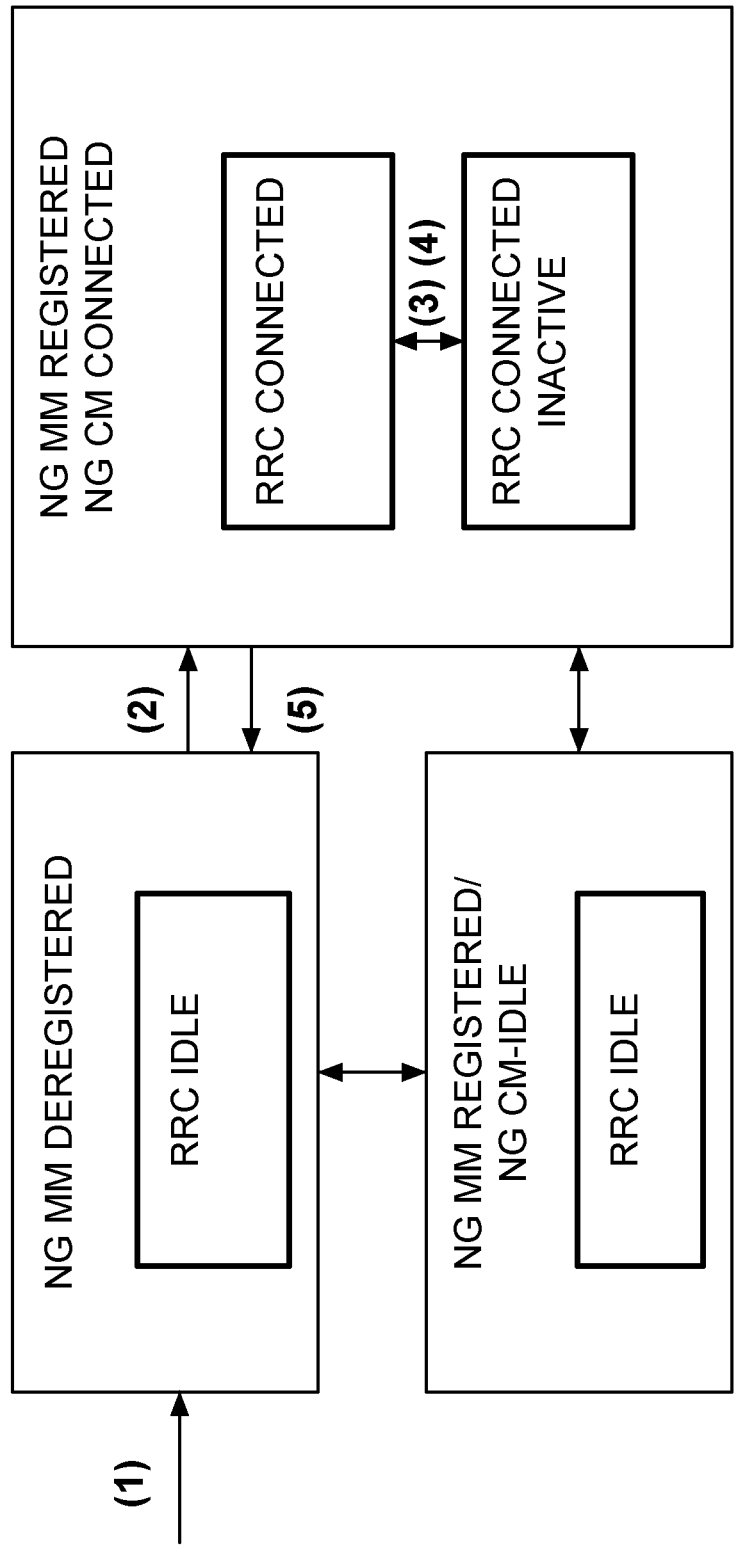
FIG. 2 illustrates a state model according to certain embodiments.

FIG. 2 illustrates a state model according to certain embodiments. There can initially be an NG mobility management (MM) deregistered state with a radio resource control (RRC) idle state. A next state can be an NG MM registered/connection management (CM) idle with an RRC idle state.

Furthermore, there can be an NG MM registered and NG CM connected state. Within this state there can be both an RRC connected state and an RRC connected inactive state.

Figure 3:
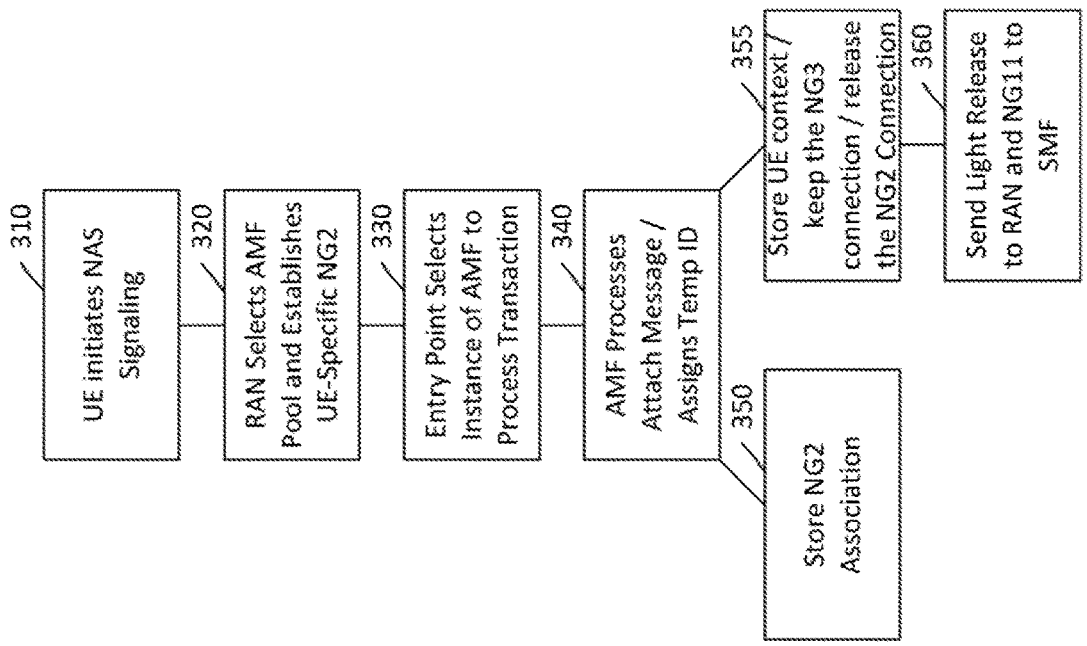
FIG. 3 illustrates a method according to certain embodiments.

FIG. 3 illustrates a method according to certain embodiments. The method can include, at 310 a UE initiating NAS signaling, for example using an attach request. At 320 the RAN can selects an AMF pool and can establish a UE specific NG2 association between the RAN and AMF pool.

At 330 an entry point (for example, load balancing (LB)) in the AMF pool can select an instance of AMF to process the transaction.

Then, at 340 the AMF can process the attach message and assign a temporary ID. This temporary ID may be associated to the AMF and Data layer where the UE context will be stored. Alternatively, the AMF provide a handle to the DL (e.g. FQDN) where the UE context is stored. The temp ID including the handle to DL is also provided to the SMF.

Upon completion of the attach procedure and completion of UP connectivity, the AMF may decide to store the UE context in the shared data layer (SDL) as the AMF may expect no further control plane messaging for the UE. Thus, there may also be no need for UE context in the cache.

At 350, if the AMF wants to continue to remain the serving node, then the AMF can store the NG2 association information in the data layer and the call flow can stop here. For subsequent transactions, the RAN can select the same AMF.

At 355, if the AMF does not want to continue to remain the serving node for the UE anymore, then the AMF can decide to just store the UE context in the SDL, keep the NG3 connection and release the NG2 connection. The AMF may decide to do this either based on type of the UE. For example, the UE may be a smart phone that may remain in long connected state in which the phone is NAS connected, UP connected, and RRC inactive. The UE may be an internet of things (IoT) device that may not send a control plane (CP) message for a long time as the UE may support a connectionless like solution for small data transfer.

Then, at 360, in case AMF decides to proceed as at 355, the AMF can send an NG2 light release to the RAN. This can provide a hint to the RAN that NG2 is released and NG3 connection is still ON. The AMF can also send an NG11 release to the SMF. This can hint to the SMF that NG4 is released while UP connectivity is still ON.

Figure 4:
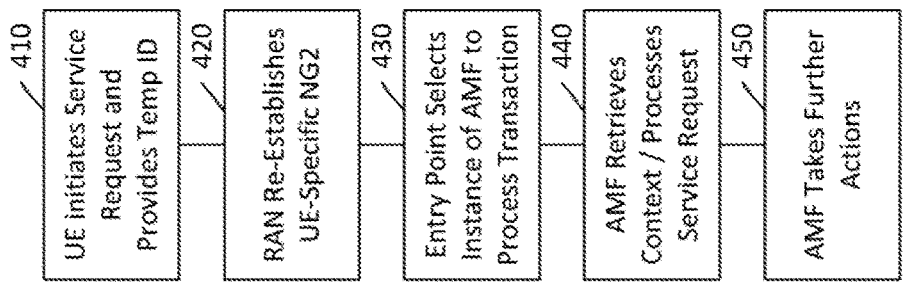
FIG. 4 illustrates a further method according to certain embodiments.

FIG. 4 illustrates a further method according to certain embodiments. FIG. 4 illustrates a subsequent MO transaction. In this case, at 410, the UE can initiate a service request and can provide the temporary ID assigned to the UE at 340. At 420, the RAN may know that the NG2 has been released thus the RAN may re-establish the UE specific NG2 association between the RAN and AMF pool. At 430, the entry point (for example, LB) in the AMF pool can select an instance of AMF to process the transaction. At 440, the selected AMF instance can use the temp ID, the UE provided to the data layer (DL) in order to determine where the UE context is stored and can retrieve the context accordingly. Then the selected AMF can process the service request. At 450, the AMF can take similar actions as described with reference to FIG. 3 at 350 or 355 and 360.

Figure 5:
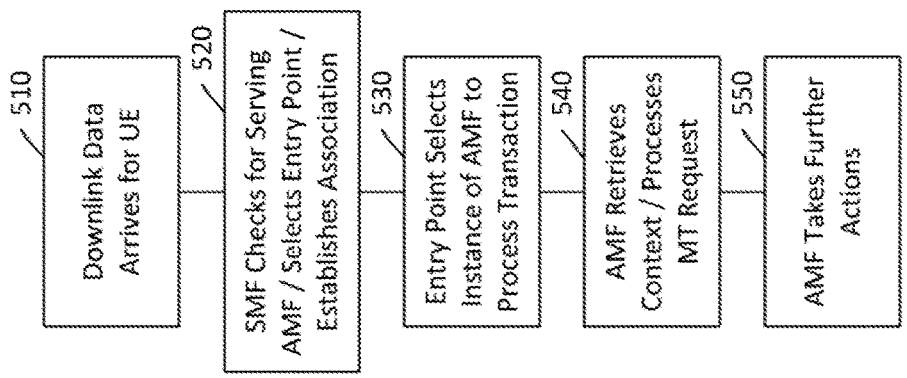
FIG. 5 illustrates an additional method according to certain embodiments.

FIG. 5 illustrates an additional method according to certain embodiments. FIG. 5 illustrates a subsequent MT transaction. In this case, at 510, downlink data can arrive for the UE. Then, at 520, the SMF may know that the NG11 connection is released. So, the SMF may check the data layer for a serving AMF. If a serving AMF is not available, then the SMF may select an entry point in the AMF pool and may establish NG11 association. At 530, the entry point (for example, LB) in the AMF pool can select an instance of AMF to process the MT transaction. Then, at 540, the selected AMF instance can use the temp ID provided by the SMF, the UE provided handle to the DL, in order to determine where the UE context is stored and can retrieve the context accordingly. Then the AMF can process the MT request, for example, downlink data message, non-access spectrum (NAS) transport request, or the like. Upon completion of the procedure, at 550 the AMF can take similar actions as described with reference to FIG. 3 at 355 and 360.

Completion of MO/MT transaction is only one possible trigger for 350 or 355 and 360. But there can be other triggers to do this as well e.g. maintenance mode (operator staff initiated), scale in, scale out, load balancing to allow UE contexts to be offloaded to other AMFs. The steps 5 and 6 can be executed in a way it does not impact UE contexts nor services provided. It may also decide on actions in 355 and 360 for IoT devices at any point.

FIG. 6 illustrates a system according to certain embodiments of the invention. It should be understood that each block of the flowchart of FIGS. 3 through 5 may be implemented by various means or their combinations, such as hardware, software, firmware, one or more processors and/or circuitry. In one embodiment, a system may include several devices, such as, for example, network element 610 and user equipment (UE) or user device 620. The system may include more than one UE 620 and more than one network element 610, although only one of each is shown for the purposes of illustration. A network element can be an access point, a base station, an eNode B (eNB), or any other network element, such as any AMF, any SMF, any RAN element, any entry point, or any other network element discussed herein.

Each of these devices may include at least one processor or control unit or module, respectively indicated as 614 and 624. At least one memory may be provided in each device, and indicated as 615 and 625, respectively. The memory may include computer program instructions or computer code contained therein, for example for carrying out the embodiments described above. One or more transceiver 616 and 626 may be provided, and each device may also include an antenna, respectively illustrated as 617 and 627. Although only one antenna each is shown, many antennas and multiple antenna elements may be provided to each of the devices. Other configurations of these devices, for example, may be provided. For example, network element 610 and UE 620 may be additionally configured for wired communication, in addition to wireless communication, and in such a case antennas 617 and 627 may illustrate any form of communication hardware, without being limited to merely an antenna.

Transceivers 616 and 626 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 620 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 620 may be a sensor or smart meter, or other device that may usually be configured for a single location.

In an exemplifying embodiment, an apparatus, such as a node or user device, may include means for carrying out embodiments described above in relation to FIGS. 3 through 5.

Processors 614 and 624 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 610 and/or UE 620, to perform any of the processes described above (see, for example, FIGS. 3 through 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 6 illustrates a system including a network element 610 and a UE 620, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments can provide a complete deterministic solution to avoid NG2 stickiness. Furthermore, certain embodiments may allow the network to determine when it wishes to remain as serving node for a given UE.

Additionally, certain embodiments provide a solution that may enable any AMF to process the UE transaction: both MO and MT. Furthermore, certain embodiments may provide an elegant solution to keep the UE context and continue with services provided for the UE despite any action taken in the control plane function.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

3GPP 3rd Generation Partnership Program
5G 5th Generation
AMF Access and Mobility Management Function
APN Access Point Name
App Application
DL Data Layer
HSS Home Subscriber Server
HSS FE HSS Front End HSS BE HSS Back End
SDL Shared data layer
eMBB Extreme Mobile Broadband
HSS Home Subscriber Server
IMEI International Mobile Equipment Identity
IMS IP Multimedia Subsystem
IMSI International Mobile Subscriber Identity
MMF Mobility Management Function
PCF Policy Control Function
SMF Session Management Function
RAN Radio access network
SDM Subscriber Data Management
DN Data Network
UPF User Plane Function

I claim:

1. A method, comprising:
processing, by an access management function (AMF), selected in an AMF pool, an attach message from a user equipment (UE) and assigning a temporary identifier to the UE;
determining, by the AMF, whether to remain a serving node for the user equipment for subsequent mobile originated transactions;
taking an action with respect to an NG2 association between a radio access network RAN and the AMF pool for the user equipment based on the determination;
wherein when the determination is that the access management function is to remain the serving node, the method comprises storing the NG2 association;
wherein when the determination is that the access management function is not to remain the serving node, the method comprises storing the user equipment context in a shared data layer; maintaining an NG3 connection for the user equipment; and releasing an NG2 connection for the user equipment;
wherein the method further comprises during a subsequent mobile originated transaction:
receiving, from the user equipment, a service request and the temporary identifier;
re-establishing the NG2 association between the RAN and the AMF pool if the NG2 connection has been released;
determining, by an AMF selected in the AMF pool, where the user equipment context is stored using the temporary identifier, retrieving the user equipment context and processing the service request.

2. The method of claim 1, further comprising:
when the determination is that the access management function is not to remain the serving node, storing user equipment context in a shared data layer.

3. The method of claim 1, further comprising:
when the determination is that the access management function is not to remain the serving node, maintaining a connection (NG3) between the next generation radio access network and one or more core user plane functions for the user equipment.

4. The method of claim 1, wherein the releasing the NG2 comprises sending an NG2 light release to a radio access network element.

5. The method of claim 1, wherein the releasing comprises sending a release of a connection (NG11) between a session management function and the access management function to the session management function (SMF).

6. The method of claim 1, wherein the determination is based on a user equipment type.

7. The method of claim 6, wherein the user equipment type comprises at least one of a smart phone or an internet of things device.

8. The method of claim 1, wherein the determination is based on whether the user equipment is expected to remain in a long connected state or whether the user equipment is expected to remain in a state that involves no or infrequent control plane messaging.

9. An apparatus, comprising:
at least one processor; and
at least one memory including computer program code,
wherein the at least one memory and the computer program code are configured to, with the at least one processor, cause the apparatus at least to perform
processing, by an access management function (AMF), selected in an AMF pool, an attach message from a user equipment (UE) and assigning a temporary identifier to the UE;
determining, by the AMF, whether to remain a serving node for the user equipment for subsequent mobile originated transactions;
taking an action with respect to an NG2 association between a radio access network RAN and the AMF pool for the user equipment based on the determination;
wherein when the determination is that the access management function is to remain the serving node, storing the NG2 association;
wherein when the determination is that the access management function is not to remain the serving node, storing the user equipment context in a shared data layer; maintaining an NG3 connection for the user equipment; and releasing an NG2 connection for the user equipment;
wherein, during a subsequent mobile originated transaction, the apparatus is caused to perform:
receiving, from the user equipment, a service request and the temporary identifier;
re-establishing the NG2 association between the RAN and the AMF pool if the NG2 connection has been released;
determining, by an AMF selected in the AMF pool, where the user equipment context is stored using the temporary identifier, retrieving the user equipment context and processing the service request.

10. A non-transitory computer readable medium encoded with instructions that, when executed in hardware, perform a process comprising:
processing, by an access management function (AMF), selected in an AMF pool, an attach message from a user equipment (UE) and assigning a temporary identifier to the UE;
determining, the AMF, whether to remain a serving node for the user equipment for subsequent mobile originated transactions;
taking an action with respect to an NG2 association between a radio access network RAN and the AMF pool for the user equipment based on the determination;
wherein when the determination is that the access management function is to remain the serving node, the process comprises storing the NG2 association;
wherein when the determination is that the access management function is not to remain the serving node, the process comprises storing the user equipment context in a shared data layer; maintaining an NG3 connection for the user equipment; and releasing an NG2 connection for the user equipment;
wherein the process further comprises during a subsequent mobile originated transaction:
receiving, from the user equipment, a service request and the temporary identifier;

re-establishing the NG2 association between the RAN and the AMF pool if the NG2 connection has been released;
determining, by an AMF selected in the AMF pool, where the user equipment context is stored using the temporary identifier, retrieving the user equipment context and processing the service request.

11. The apparatus of claim 9, further comprising:
when the determination is that the access management function is not to remain the serving node, storing the user equipment context in a shared data layer.

12. The apparatus of claim 9, further comprising:
when the determination is that the access management function is not to remain the serving node, maintaining a connection (NG3) between the next generation radio access network and one or more core user plane functions for the user equipment.

13. The apparatus of claim 9, wherein the releasing the NG2 comprises sending an NG2 light release to a radio access network element.

14. The apparatus of claim 9, wherein the releasing comprises sending a release of a connection (NG11) between a session management function and the access management function to the session management function.

15. The apparatus of claim 9, wherein the determination is based on a user equipment type.

16. The apparatus of claim 15, wherein the user equipment type comprises at least one of a smart phone or an internet of things device.

* * * * *